May 18, 1937.　　　　D. H. HILL　　　　2,080,661

THERMOSTATIC CONTROL

Filed March 13, 1936

INVENTOR.
DEWEY H. HILL.
BY
Lockwood Goldsmith & Galt
ATTORNEYS.

Patented May 18, 1937

2,080,661

UNITED STATES PATENT OFFICE 2,080,661

THERMOSTATIC CONTROL

Dewey H. Hill, Kokomo, Ind., assignor to Globe American Corporation, Kokomo, Ind., a corporation Application March 13, 1936, Serial No. 68,680

1 Claim. (Cl. 200—140)

This invention relates to thermostatic controls for closures, and particularly as applied to brooders and incubators. The object of the invention resides in the arrangement and mounting of the thermostatic control element within the closure, such as a brooder or incubator, and an electric switch exteriorly thereof for regulating the heating current therein, controlled through the wall of the closure by a thermostatically actuated member. More specifically, the invention relates to an improvement in the mounting of automatic heat controls, such as the electric control switch with relation to the thermostatic element for actuating the same and is particularly suitable for use in brooders for rearing of chicks, or for the incubation of eggs artificially in incubation.

In electrically heated brooders or incubators for the brooding of fowls or the incubation of eggs, it is customary to employ a thermostatically operated switch to control the temperature thereof. The thermostatic element must of necessity be located within the heated chamber, the switch member itself being located either within or without the chamber and provided with suitable means for transmitting thereto the thermostatic action. It is general practice to mount the switch outside the chamber in order to avoid the dust and down, as well as the humidity there present. Given such installation, the action of the thermostatic element is usually transmitted to the switch through the medium of a more or less complicated series of levers, plus some provision for adjusting the relation of the thermostatic element to the switch for securing the desired degree of temperature.

One feature of this invention resides in entirely dispensing with such series of levers and securing direct action between the thermostatic element and the switch mechanism.

Another feature of the invention resides in the means for obtaining adjustment between the switch mechanism and the thermostatic element necessary to develop and hold the desired temperature, by mechanically moving the switch mechanism bodily toward or away from the thermostatic element.

Figure 1:
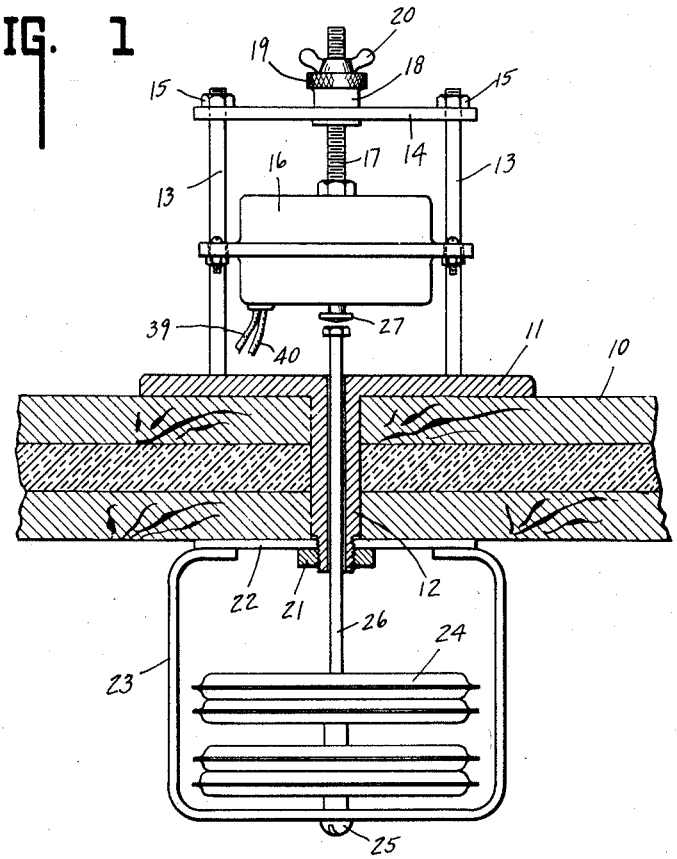
Figure 2:
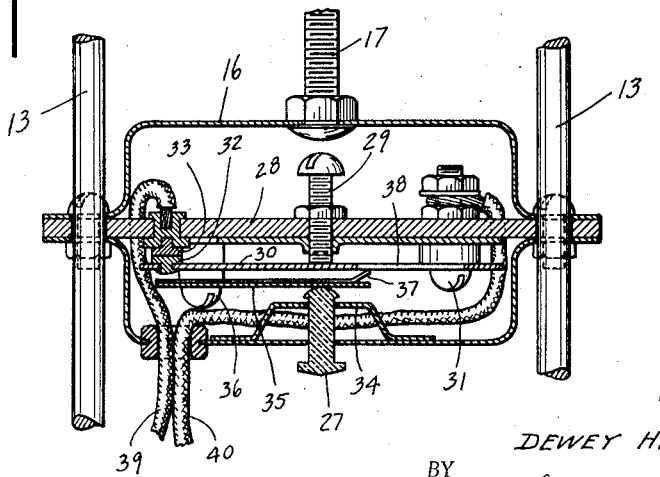

The full nature of the invention will be understood from the accompanying drawing and the following description and claim:

Fig. 1 shows a section through a portion of the top wall of a brooder or incubator, showing the thermostatic element and switch mechanism in elevation. Fig. 2 is a central vertical section through the switch mechanism.

In the drawing there is illustrated in section the upper wall 10 of an incubator, brooder or the like, the interior compartment of which is below the upper wall 10 and is adapted to be heated by electric heating elements, not shown.

Mounted exteriorly of the chamber and supported upon the upper surface of the top wall 10, there is a base plate 11 having a downwardly-projecting tubular thimble 12 adapted to extend through a suitable opening provided in the wall 10. Mounted upon the base there is a pair of upwardly extending standards 13 to which a cross member 14 is fixedly secured by the nuts 15. Slidably mounted on said standards to permit of vertical movement toward and away from the wall 10, there is a housing 16 containing an electric switch mechanism. Said housing has the upper wall thereof rigidly connected with the lower end of a threaded bolt 17 extending upwardly through a collar 18 on the cross piece 14. A knurled nut 19 is adapted to screw upon the bolt 17 above the collar 18 and be locked in adjusted position by a winged lock nut 20.

Through the medium of the threaded bolt 17 secured to the housing 16 of the switch, the switch may be slidably raised and lowered upon the standards 13. This is accomplished by loosening the lock nut 20 and turning the nut 19 so as to raise or lower the bolt with respect to the cross bar 14.

Removably secured to the lower end of the thimble 12 by a nut 21 there is a supporting plate 22 from which a depending bracket 23 extends. Said bracket supports a thermostatic element, such as indicated by the bellows 24. Said element is fixed to the bottom of the bracket 23 by the screw 25, but is free to move upwardly with respect to the bracket upon being expanded by an increase in temperature within the chamber, or lower itself by contraction due to a decrease in temperature within the chamber. Slidably mounted within the thimble 12, there is provided an actuating rod 26 having the lower end thereof in engagement with the top of the thermostatic element 24. The upper end of said rod is in position to engage and actuate a plunger 27 slidably extending through the bottom of the switch housing 16 for operating the snap switch contained therein.

As illustrated in Fig. 2, the switch housing embodies a base plate 28 through the center of which extends an adjustable screw 29 against the lower end of which a bronze leaf spring 30 bears, whereby a fulcrum for said spring is provided intermediate its ends. One end of the spring is rigidly secured to the base by the screw 31, while the opposite end thereof is provided with a contact member 32 adapted to make and break contact with the contact member 33 secured to the base 28. For actuating the spring, the plunger 27 extends through the bottom of the housing and is guided in its sliding movement by a bearing member 34 so as to engage a lever 35 having one end rigidly secured by a screw 36. Said lever is provided with a tongue 37 which bears against that portion of the spring which is longitudinally slotted as indicated at 38. The fixed contact member 33 is connected to one side of the circuit by the lead line 39 extending through an aperture in the housing, while the fixed end of the spring 30 is electrically connected through the screw 31 and lead line 40 to the other side of the circuit.

In operation, upon the thermostatic element in the form of the bellows 24 being caused to expand, the rod 26 is forced upwardly into engagement with the pin 27, which is caused thereby to exert an upward pressure against the lever 35 which in turn, through the tongue 37, exerts pressure against the spring 30 on one side of the bolt 29. Such pressure causes the free end of the spring carrying the contact member 32, to be sprung away from contact with the member 33 for breaking the circuit.

Upon a decrease in heat, permitting contraction of the bellows, the pressure against the spring 30 is relieved so that it returns to contact position, whereupon the circuit through the heating element (not shown) is closed.

In order that the temperature of the chamber may be controlled through adjustment, the switch is moved bodily toward and away from the upper end of the pin 26, or the thermostatic element. This movement is accomplished by sliding the entire housing of the switch up and down with respect to the cross member 14 through manipulation of the knurled nut 19. Thus, the entire switch may be adjusted to such a position with respect to the thermostatic element as to break the circuit through the heating elements upon the bellows being expanded to a predetermined position.

The invention claimed is:

A temperature control device of the character described, including a supporting wall, thermostatically operated bellows positioned on one side of said wall, a bracket for rigidly supporting said bellows thereon, an electric current control switch positioned on the other side of said wall, a pair of standards mounted on said wall for slidably supporting said switch thereon, a manually actuated screw for adjusting the position of said switch upon said standards, a plunger adapted to be moved to break the circuit of said switch, and a rod slidably extending through said wall in alignment with said plunger adapted to be actuated by said bellows for moving said plunger to and from circuit breaking position, depending upon the adjusted position of said switch with respect to said wall and element.

DEWEY H. HILL.